UNITED STATES PATENT OFFICE.

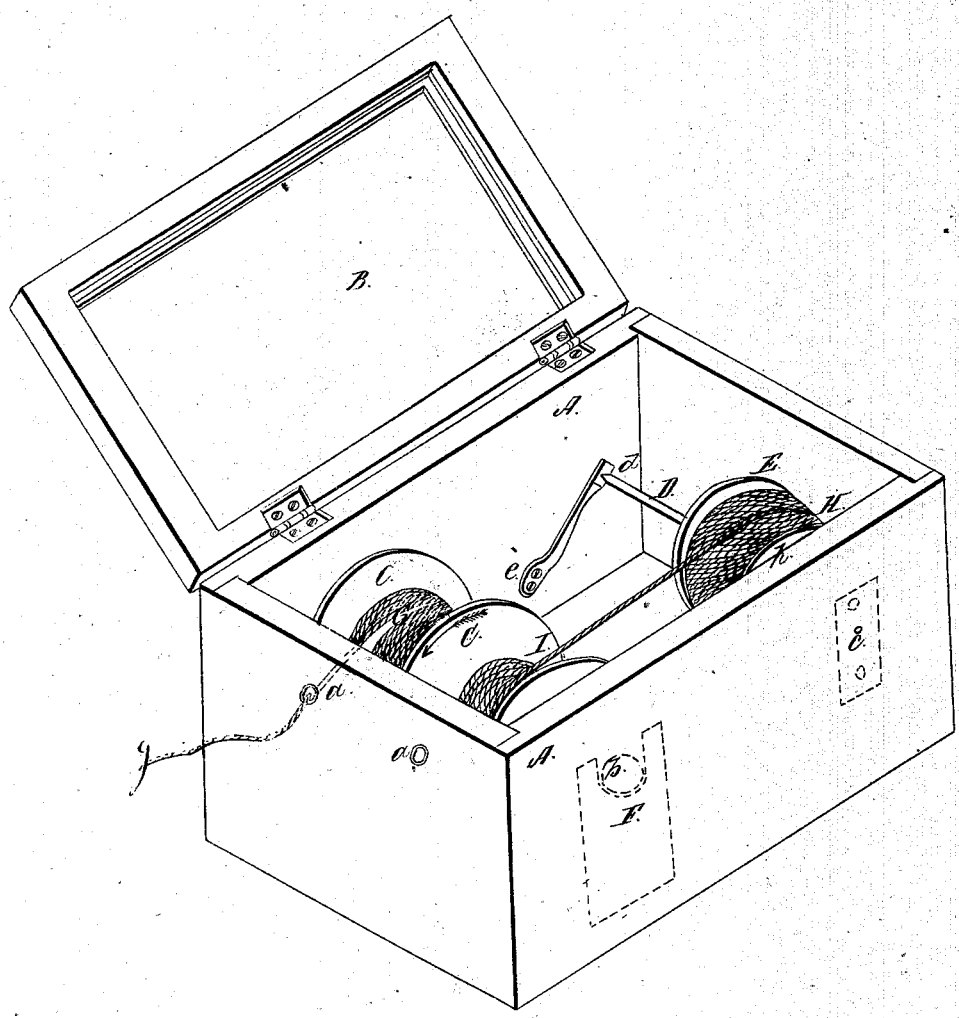

FRANCIS A. PARMELEE, OF NEW HAVEN, CONNECTICUT.

TWINE-SPOOL.

Specification of Letters Patent No. 26,287, dated November 29, 1859.

*To all whom it may concern:*

Be it known that I, FRANCIS A. PARMELEE, of the city and county of New Haven, in the State of Connecticut, have invented a new and useful Improvement in Twine-Spools, as a new article of manufacture; and I do hereby declare that the following is a full, clear, and exact description of the construction, character, and operation of the same, reference being had to the accompanying drawing, which makes part of this specification, which drawing is a perspective view of the whole apparatus, showing the double spool and ball of twine on the spindle, so that it will wind onto the spool.

My improvement consists in so constructing the apparatus that, by the use of the double spool and the spindle, I am able, by the act of drawing off the twine, (in using it,) from one part of the spool, to fill the other part by winding the twine from a ball on the spindle, so that when the twine is exhausted from one part of the spool, (by using it,) the other part will be filled ready for use.

I make the box, A, A, of wood, or any other material, having a suitable top containing a glass B, hinged to it (when desired,) and two holes in the end through which I draw the twine, as shown at *a*, *a*, substantially as represented in the drawing.

I make the spool double, as shown at C, C, C, by turning it from a solid block, or by making it in four pieces and securing the C, C, C. I then wind on a ball of twine, as suitable means or I cast it, of any suitable metal, in one piece, and finish it in any convenient way, with proper journals on the ends of the arbor, as shown in dots, at *b*, to rest in suitable bearings, as indicated in dots at F.

I make the spindle, D, of cast steel, or any other suitable material, and if thought best, I secure a disk, as E, on its center, (and, I may also, slip on a disk, as *h*, after the ball,) to steady the ball, while the twine is being transferred to the spool, as indicated in the drawing.

Having made the several parts, as above described, and represented in the drawings, I place the spool in the box, with the journal of the shaft, or arbor, resting in the bearings, as indicated by the dots, at F, and *b*, when the spool will appear as represented at C, C, C. I then wind on a ball of twine, as at G, and pass the end of it out through a hole for use, as at *a*. I place a ball of twine, (as shown at H,) on the spindle, D, and insert one of the pivots of this spindle into a proper bearing, in a metal plate, screwed onto the inside of the box, as indicated in dots at *c*, and the other pivot, into a spring bearing, as shown at *d*. This spring is secured to the inside of the box as shown at *e*, and it not only renders it convenient to take out the spindle, D, to put on another ball of twine, but also causes a friction, (in the longitudinal direction,) on the pivots of the spindle, which can be adjusted so as to produce the desired degree of tension on the twine to cause it to wind smoothly on the spool as it comes from the ball on the spindle. To use the spool, I take hold of the twine at *g*, and draw it off for use, as needed; and as by drawing off the twine the spool will be revolved, in the direction indicated by the dart, it will wind the twine from the ball, H, onto the spool, at I, so that when the twine is all used from the part, G, the whole of the ball, H, will be wound onto the part, I, of the spool. I then place another ball of twine on the spindle, (as at D,) and attach the end of its twine to the part, G, of the spool, and use that on the part, I, of the spool, and so on, always having a spool of twine ready wound for use.

What I claim as my invention, and desire to secure by Letters Patent, is—

The combination of the double spool, (C, C, C,) with the spindle, (D,) when the whole is constructed, substantially, as herein described.

F. A. PARMELEE.

Witnesses:
S. THOMPSON,
R. FITZGERALD.